(12) United States Patent
Bennett et al.

(10) Patent No.: US 12,379,852 B2
(45) Date of Patent: Aug. 5, 2025

(54) PARTIAL DIE BLOCKS

(71) Applicant: Western Digital Technologies, Inc., San Jose, CA (US)

(72) Inventors: Alan D. Bennett, Edinburgh (GB); Sergey Anatolievich Gorobets, Edinburgh (GB)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/357,789

(22) Filed: Jul. 24, 2023

(65) Prior Publication Data

US 2024/0377960 A1 Nov. 14, 2024

Related U.S. Application Data

(60) Provisional application No. 63/501,435, filed on May 11, 2023.

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
CPC ...... G06F 3/0619; G06F 3/0688; G06F 3/065; G06F 3/0652; G06F 3/0631; G06F 12/0246; G06F 12/1009; G06F 12/1027; G06F 2212/7201; G06F 2212/68

See application file for complete search history.

(56) References Cited

U.S. PATENT DOCUMENTS

| | | | |
|---|---|---|---|
| 9,442,662 B2 | 9/2016 | Dancho et al. | |
| 10,614,881 B2 | 4/2020 | Papandreou et al. | |
| 10,996,867 B2 | 5/2021 | Huang et al. | |
| 11,609,819 B2 | 3/2023 | Cariello | |
| 2017/0091022 A1* | 3/2017 | Khan | G06F 11/1068 |
| 2017/0286286 A1* | 10/2017 | Szubbocsev | G06F 12/0246 |
| 2018/0373438 A1 | 12/2018 | Bennett et al. | |
| 2019/0205043 A1* | 7/2019 | Huang | G06F 12/1009 |
| 2020/0210282 A1* | 7/2020 | Cariello | G06F 11/108 |
| 2020/0401328 A1 | 12/2020 | Lee | |
| 2022/0214808 A1 | 7/2022 | Lin | |
| 2022/0413699 A1 | 12/2022 | Luo et al. | |
| 2023/0075329 A1* | 3/2023 | Surianarayanan | G06F 3/0653 |

(Continued)

FOREIGN PATENT DOCUMENTS

WO 2019-133198 A1 7/2019

OTHER PUBLICATIONS

International Search Report and Written Opinion for Application No. PCT/US2024/010595 dated May 7, 2024.

*Primary Examiner* — Tracy C Chan

(74) *Attorney, Agent, or Firm* — Patterson + Sheridan, LLP

(57) ABSTRACT

Rather than having unused die blocks, partial die blocks can contribute to a super block. In so doing, as much of the available physical capacity of the data storage device may be achieved. The result could be an increase in over provisioning (OP) and good capacity for the data storage device or an increase in die yield. An increase in good capacity through the use of previously unused physical blocks would lead to an increase in performance and endurance. A yield increase would result in a reduction in cost per die and per data storage device. A partial die block is the solution.

23 Claims, 6 Drawing Sheets

(56) References Cited

U.S. PATENT DOCUMENTS

| | | | | |
|---|---|---|---|---|
| 2023/0152973 A1* | 5/2023 | Hwang | ............... | G06F 3/0608 |
| | | | | 711/103 |
| 2023/0325278 A1* | 10/2023 | Desai | ............... | G06F 11/1076 |
| | | | | 714/6.22 |
| 2024/0028230 A1* | 1/2024 | Bert | ............... | G06F 3/064 |
| 2024/0134561 A1* | 4/2024 | Aiouaz | ............... | G06F 3/0679 |

* cited by examiner

FIG. 4

CONVENTIONAL SSD 410 — EVEN FORMING - CURRENT

| | 0 | 1 | 2 | 3 | 4 | 5 | 6 | 7 | 4-PLANES | 3-PLANES | TOTAL |
|---|---|---|---|---|---|---|---|---|---|---|---|
| | 4 | | 4 | 4 | 4 | 4 | 4 | 4 | 7 | 0 | 28 |
| | 4 | 4 | | 4 | 4 | 4 | 4 | 4 | 6 | 0 | 24 |
| | 4 | 4 | | 4 | 4 | 4 | 4 | 4 | 6 | 0 | 24 |
| | 4 | 4 | 4 | 4 | 4 | 4 | | 4 | 6 | 0 | 24 |
| | 4 | 4 | 4 | 4 | 4 | 4 | | 4 | 6 | 0 | 24 |
| | 4 | 4 | 4 | 4 | 4 | 4 | 4 | 4 | 7 | 0 | 28 |
| | 4 | 4 | 4 | 4 | 4 | 4 | 4 | 4 | 7 | 0 | 28 |
| | 4 | 4 | 4 | 4 | 4 | 4 | 4 | 4 | 7 | 0 | 28 |

DIE

FLEXIBLE SSD 420 — EVEN FORMING WITH 3-PLANE SUPPORT

| | 0 | 1 | 2 | 3 | 4 | 5 | 6 | 7 | 4-PLANES | 3-PLANES | TOTAL |
|---|---|---|---|---|---|---|---|---|---|---|---|
| | 4 | 4 | 4 | 4 | 4 | 4 | 4 | 4 | 6 | 0 | 24 |
| | 4 | 4 | 4 | 4 | 4 | 4 | 4 | 4 | 6 | 0 | 24 |
| | 4 | 4 | | 4 | 4 | 3 | 4 | 4 | 6 | 0 | 24 |
| | 3 | 3 | 4 | 3 | 3 | 4 | 3 | 3 | 5 | 1 | 23 |
| | 4 | 4 | 3 | 4 | 4 | 3 | 3 | 3 | 3 | 4 | 24 |
| | 3 | 3 | 4 | 4 | 4 | 3 | 3 | 4 | 4 | 3 | 25 |
| | 4 | 4 | 4 | 4 | 4 | 4 | 4 | | 5 | 2 | 26 |
| | 4 | 4 | 4 | 4 | 4 | 4 | 3 | 4 | 6 | 1 | 27 |

DIE

PARTIAL DIE BLOCKS

CROSS-REFERENCE TO RELATED APPLICATIONS

This application claims benefit of U.S. provisional patent application Ser. No. 63/501,435, filed May 11, 2023, which is herein incorporated by reference.

BACKGROUND OF THE DISCLOSURE

Field of the Disclosure

Embodiments of the present disclosure generally relate to use of traditionally unused die blocks.

Description of the Related Art

In solid state devices (SSD) that comprise super die blocks (i.e., super block), the super blocks are formed from full (i.e., complete) die blocks. A super block may contain planes that have die blocks that are considered bad (i.e., bad block) with in the planes of the super block. The number of times that a die block can contribute to the super block is determined by the worst plane. The worst plane being the plane with the most amount of bad blocks.

The distribution of bad die blocks does not span evenly across planes. During programming, dies are busy for the same amount of time whether one plane or all planes are being programmed. Hence, the more planes that can be programmed in parallel, the more efficient utilization of dies occurs. The use of full die blocks improve performance. Full die blocks have a physical block from every plane. In such a situation, the number of die blocks that can be formed is limited by the worst plane. Hence, there are some good blocks in the better planes (i.e., the planes that have at least one bad die block). Those good blocks remain unused. The number of unused die blocks is worse if the number of bad die blocks across the planes is skewed.

In the past two plane super blocks could leave at least one bad die block across the planes. Now that the number of planes has increased, therefore there has been an increase in the skew of the bad die blocks across the super blocks causing discrepancy in performance.

Therefore, there is a need in the art for improved use of die blocks through partial die-blocks contributions.

SUMMARY OF THE DISCLOSURE

Rather than having single die blocks, partial die blocks can contribute to a super block. In so doing, as much of the available physical capacity of the data storage device may be achieved. The result could be an increase in over provisioning (OP) and good capacity for the data storage device or an increase in die yield. An increase in good capacity through the use of previously unused physical blocks would lead to an increase in performance and endurance. A yield increase would result in a reduction in cost per die and per data storage device. A partial die block is the solution.

In one embodiment, a data storage device comprises: a memory device having a plurality of planes and a plurality of dies; and a controller coupled to the memory device, wherein the controller is configured to: detect that one or more planes of the plurality of planes have one or more bad blocks; and create one or more first super blocks using blocks from less than all of the planes of the plurality of planes.

In another embodiment, a data storage device comprises: a memory device; and a controller coupled to the memory device, wherein the controller is configured to: create one or more first super blocks comprising full die blocks; and create one or more second super blocks comprising a mix of full die blocks and partial die blocks.

In another embodiment, a data storage device comprises: means to store data; and a controller coupled to the means to store data, wherein the controller is configured to: set a super block size for a zoned namespace (ZNS) environment of the means to store data; and create one or more first super blocks comprising a mix of full die blocks and partial die blocks, wherein the one or more first super blocks include at least two adjacent full die blocks.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates an exemplary SSD with conventional and flexible plane support, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than having single die blocks, partial die blocks can contribute to a super block. In so doing, as much of the available physical capacity of the data storage device may be achieved. The result could be an increase in over provisioning (OP) and good capacity for the data storage device or an increase in die yield. An increase in good capacity through the use of previously unused physical blocks would lead to an increase in performance and endurance. A yield increase would result in a reduction in cost per die and per data storage device. A partial die block is the solution.

Figure 1:
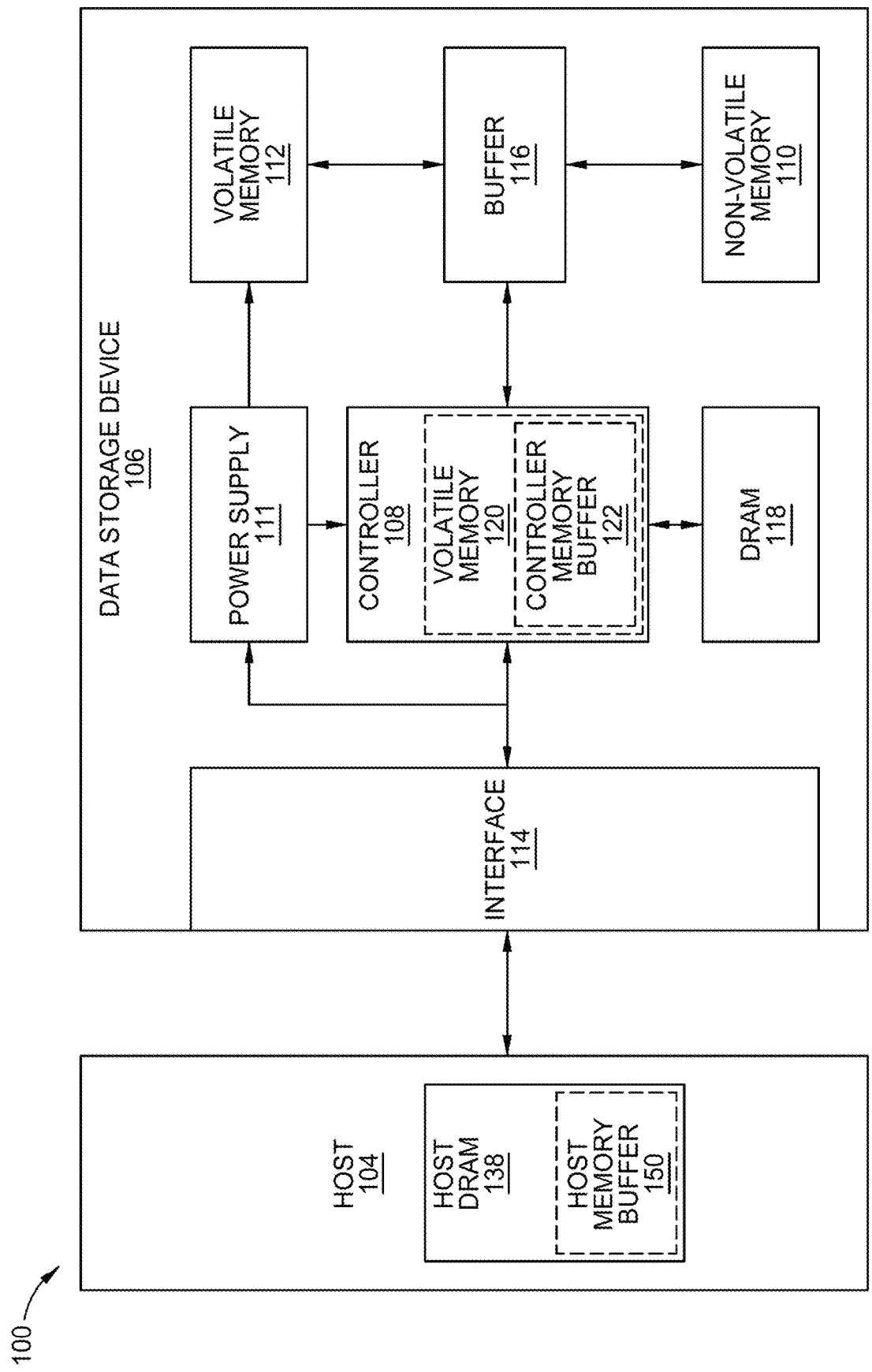
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
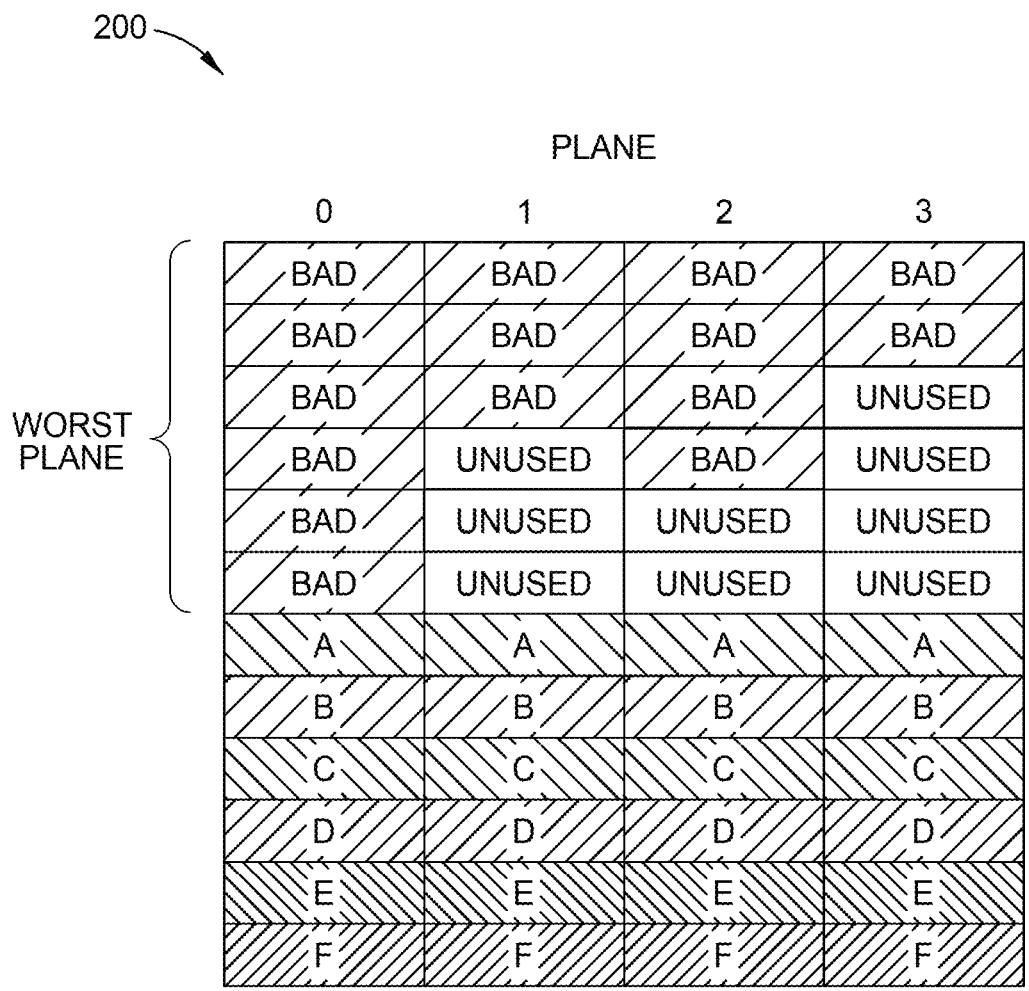
FIG. 2 illustrates an exemplary full die block with unused good die blocks, according to certain embodiments.

FIG. 2 illustrates an exemplary full die block 200 with unused good die blocks, according to certain embodiments. The full die block 200 comprises planes 0-3 which are able to make full die blocks A-F. Plane 0 is the worst plane in the full die block 200 because plane 0 has the greatest amount of bad blocks (i.e., six bad blocks). Since plane 0 is the worst plane, plane 0 will determine how many die super blocks can be formed (super block A-F).

Currently, super blocks are formed from full die blocks. The die blocks are selected from one or more dies within a device. A small number of missing die is possible, but each die provides an erase block from every plane. Several good blocks remain unused. The number of full die blocks is determined by the worst plane. The number of unused blocks is worse if the number of bad blocks across the planes is skewed. In four plane memory, there will likely be more unused blocks. The example shown in FIG. 2 shows six full die blocks with nine erase blocks that remain unused. Thus, the die can contribute to only six super blocks. The die blocks that are labeled as unused are still good blocks, but can't be used because the unused blocks are not recognized as useful to the super block in conventional SSD.

It is to be noted that in full die block 200 all of the bad blocks and unused blocks are at the top of each plane for clarity. In practice, the bad blocks and unused blocks can be physically scattered randomly throughout the plane or logically put in the beginning. The full die block 200 can support a small number of missing dies. Each die provides an erase block from every plane. Several good blocks will remain unused even with the number of full die blocks present.

Figure 3:
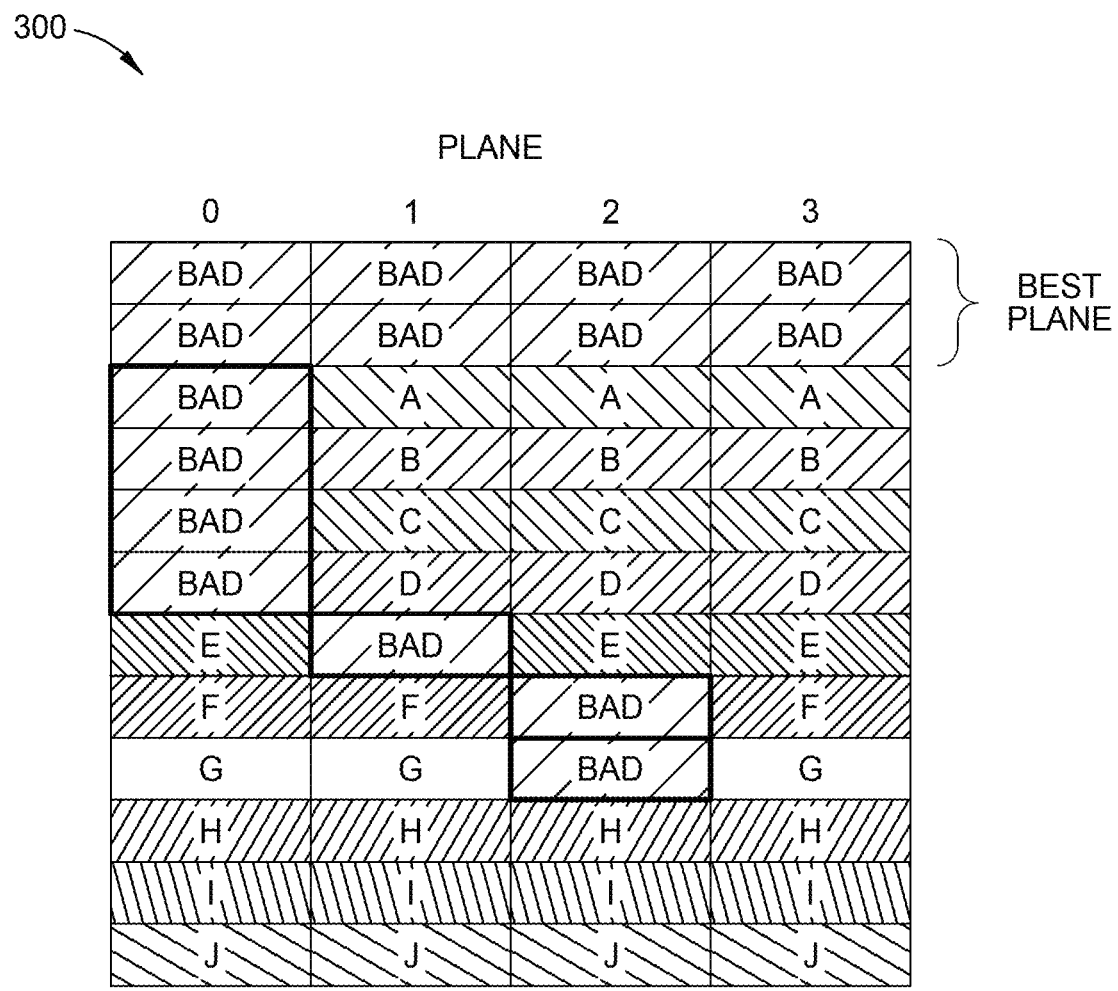
FIG. 3 illustrates an exemplary combination of full die blocks and partial die blocks, according to certain embodiments.

FIG. 3 illustrates an exemplary combination 300 of full die blocks and partial die blocks, according to certain embodiments. The combination 300 comprises planes 0-3 which are able to make blocks A-J. Plane 3 is the best plane in the super block 300 because plane 3 has the least amount of bad blocks (2 bad blocks). It is to be noted that combination 300 has the same amount of bad blocks as full die block 200. Combination 300 has no unused blocks in any of the four planes. The number of partial die blocks is determined by the number of bad blocks in each plane. Allowing partial die blocks with 1 missing plane allows for all excess bad blocks to be used.

In the example of FIG. 3, there are partial die blocks with erase blocks from three of the planes. Allowing partial blocks with one missing plane allows for all erase blocks to be used. The example of FIG. 3 shows three full die blocks and seven partial die blocks with each partial die block having an erase block from three of the planes. Thus, the die is able to contribute to ten super blocks as opposed to six as shown in FIG. 2. The distribution of the bad blocks is the same as in FIG. 2, but the number of partial die blocks is determined by the number of bad blocks in each plane more than the best plane. The best plane is plane 3 that has two bad blocks. The excess bad blocks are four bad blocks for plane 0, one bad block for plane 1, and two bad blocks for plane 2. The total number of excess bad blocks equals seven.

FIG. 4 illustrates an exemplary SSD with conventional and flexible plane support, according to certain embodiments. The conventional SSD 410 is evenly sized across the best possible planes. For conventional SSD 410, the even forming to create super blocks with n or n+1 full die blocks is implemented. Even forming is when super blocks have similar sizes meaning consistent performance. Even forming allows the use of all available full die blocks. The number of super blocks have either six or seven full die blocks. The total number of planes in each super block is either twenty four or twenty eight. Previously, the approach was to make super blocks formed from a similar number of die blocks (n or n+1) where each of the die blocks were the same size (since an erase block was present in every plane). Once there is a failure in a single erase block, then the failed block can be replaced with an unused block. However, if the failure is in the worst plane then the whole block would not be able to be used. The previous approach leads to a skew between the best planes and the worst planes.

In the conventional SSD 410, there is a consistent four planes contributing to the super block from the die blocks as described above in the previous approach. For example in the conventional SSD 410, the predetermined number of planes that need to be contributed from each die block across the super block is four planes. The even contribution leads to skews in the total number of contributions once the die blocks fail. A die block will be considered failed once a die block cannot contribute the total required amount of planes (four for this example) to the super block. Even though a die block may have less planes to the super block the die block will still be considered failed. The example of range of planes is only 24 and 28. With the use of all planes contributing in the conventional SSD 410, there is no flexibility for planes to be used because the planes are occupied contributing. Opposed to with SSD 420 all planes are not occupied with contributing to the super block.

With partial die blocks, a super block with a mix of full and partial die blocks can be formed. There is a caveat that if a parity die is present then the parity die needs to be a full die block. If Manifest is present in enterprise products then Manifest should also be written to a full die block for firmware simplicity and should be adjacent to the parity die. SSD 420 shows a range of super blocks with either all full die blocks or a mixture, and the result is a range of planes from twenty three to twenty seven blocks.

In the flexible SSD 420, three plane contribution from a die blocks is accepted even though the total plane contribution is four planes. As seen in the flexible SSD 420, three plane support is accepted which leads to less discrepancy in total contributions. The total number of accepted planes can range from four planes to three planes depending upon what a die block can contribute. The contribution of three planes from a die block can be considered as a partial die block. Even though the plane is not the total amount (four planes), the super block will still accept the contribution of the three remaining planes. The total number of contributions is more even when accepting three planes because when a die block doesn't have the four planes to contribute, the super block will still accept three planes as contributions. The varied plane contribution ultimately creates less skew in total plane contribution across the dies compared to the previous approach. The flexibility of using multiple plane sizes for contribution leads to more use of the planes and increased performance.

Figure 5:
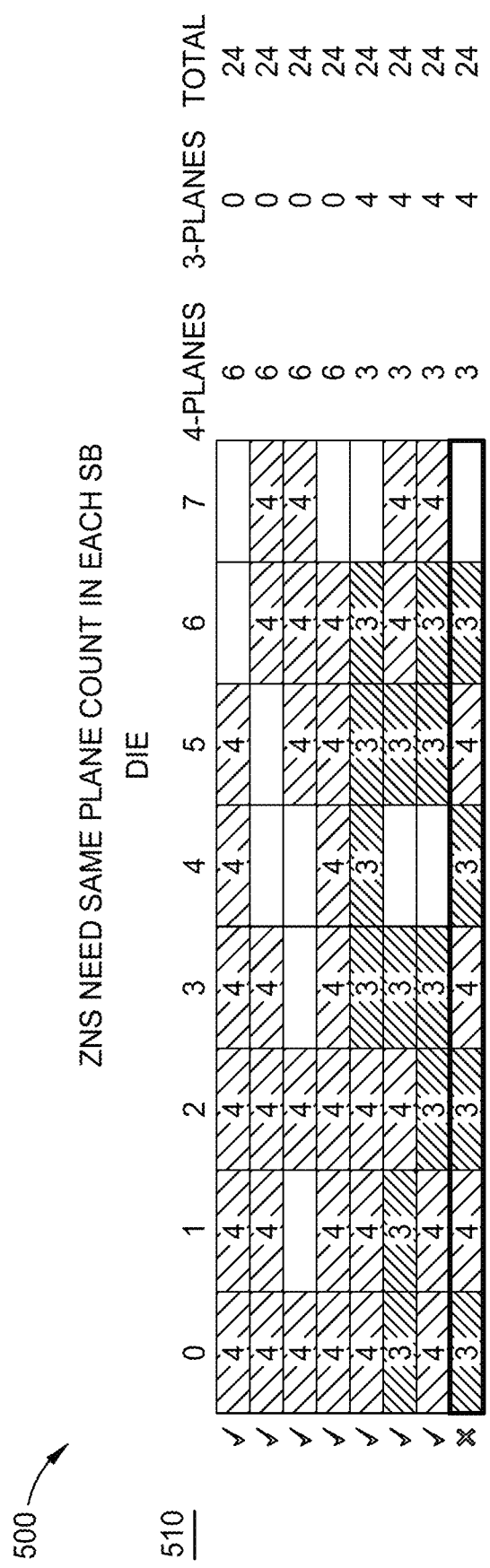
FIG. 5 illustrates an exemplary zoned namespace (ZNS) SSD with fixed super block size, according to certain embodiments.

FIG. 5 illustrates an exemplary ZNS SSD 500 with fixed super block size, according to certain embodiments. In the ZNS SSD 500 architecture, all the super blocks have the same size. Furthermore, the zones are a fixed logical size to be able to fit all logical data into the super block. All of the super blocks in the ZNS SSD 500 total 24 planes in FIG. 5. The die blocks will contribute at max four planes up until the super block reaches 24 total plane contributions. The plane contribution is random for each die block as long as the total planes contributed to the super block is 24. In the ZNS SSD 500, the super blocks are formed from either six full die blocks or three full die blocks and four partial die blocks. For larger super blocks, there could be eight partial die blocks (must be a multiple of four). Up to about three partial die blocks will be unused. At least two fully populated dies must be together (consecutive). At least two fully populated die blocks must be together (consecutive or adjacent), but can be placed anywhere (beginning or middle) within the die. The final entry is therefore illegal because there is not two adjacent full die blocks for the optional manifest or optional parity die.

There may be other restrictions as seen in the ZNS SSD 500 that some die blocks are missing, which cause the use of three plane contribution or partial die block use to reach the required total contribution number (24 planes). Other restrictions may include but not limited to parity in the die block and the architecture. A manifest that has a table of what is already written to the super blocks can identify valid data later during garbage collection (GC).

Figure 6:
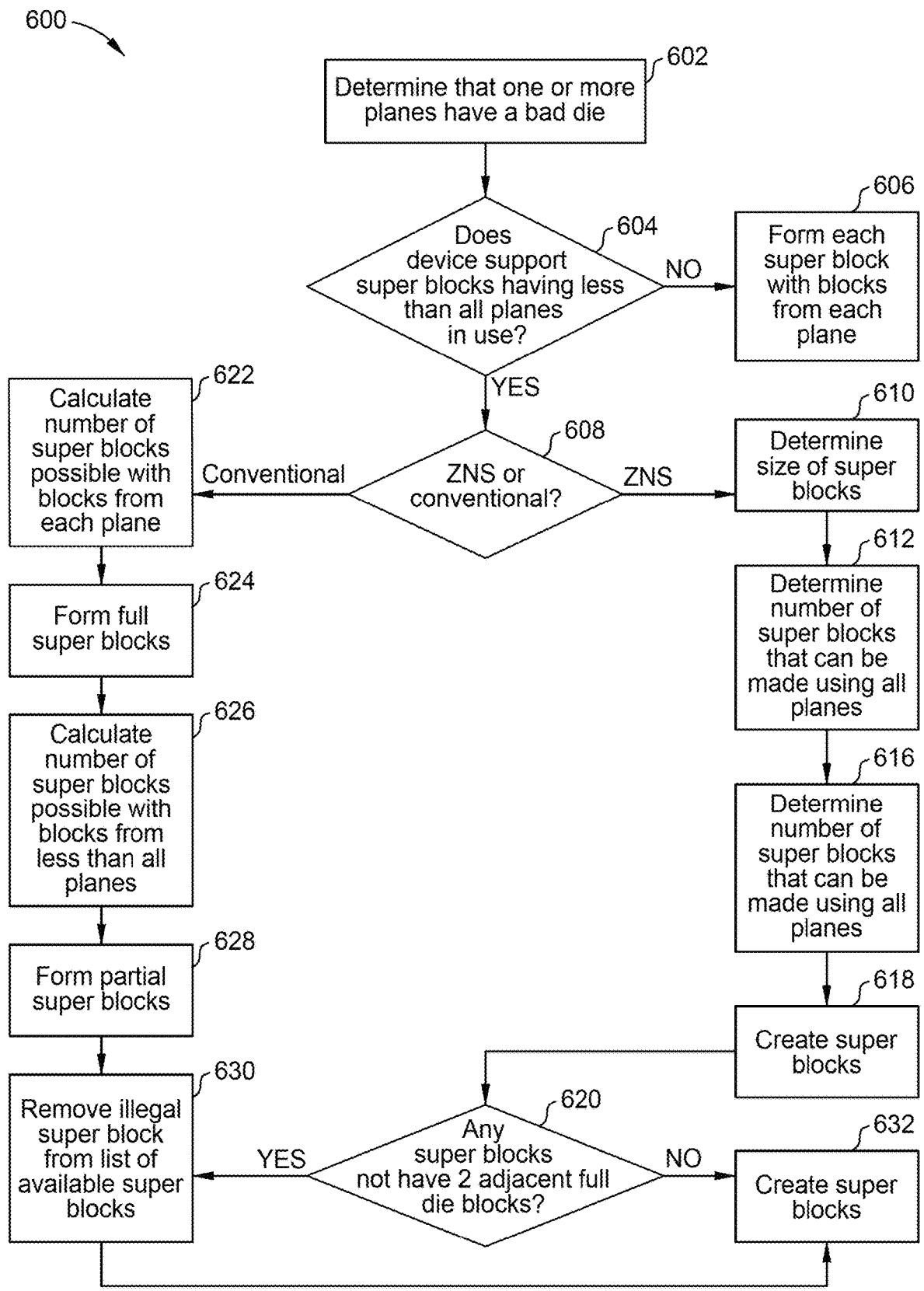
FIG. 6 is a flow chart illustrating a method for identifying a conventional SSD and a ZNS SSD for use of partial die block contribution, according to certain embodiments.

FIG. 6 is a flow chart illustrating a method 600 for identifying a conventional SSD and a ZNS SSD for use of partial die block contribution, according to certain embodiments. Partial die blocks can be implemented in both conventional SSD's and ZNS SSD's. To determine which SSD needs to use partial die blocks will be determined by the controller such as the controller 108 of FIG. 1.

The method 600 begins at block 602. At block 602, the controller determines that one or more planes have one or more bad die blocks. At block 604, the controller determines whether the device supports super blocks having less than all planes in use. If the controller determines that the device cannot support super blocks having less than all planes in use then the method 600 proceeds to block 606. At block 606, the controller forms each super block with blocks from each plane. If the controller determines that the device can support super blocks having less than all planes in use then the method 600 proceeds to block 608. At block 608, the controller determines if the SSD is ZNS or conventional.

If the controller determines that the SSD is ZNS then the method 600 proceeds to block 610. At block 610, the controller determines the size of the super block. At block 612, the controller determines the number of super blocks that can be made using all planes. At block 616, the controller determines the number of super blocks that can be made using less than all planes. At block 618, the controller creates super blocks. At block 620, the controller determines if any super blocks do not have two adjacent full die blocks. If the controller determines that super blocks do not have two adjacent full die blocks, then the method proceeds to block 630.

If the controller determines that the SSD is conventional at block 608, then the method 600 proceeds to block 622. At block 622, the controller calculates number of super blocks possible with blocks from each plane. At block 624, the controller forms full super blocks. At block 626, the controller calculates the number of super block possible with blocks from less than all planes. At block 628, the controller forms super blocks. At block 630, the controller removes illegal super block from list of available super blocks. At block 632, the controller begins using super blocks.

The use of partial die blocks will replace the existing conventional method and apply to all data types (host data and tables), thus allowing leverage for different product types. If a drive is built there's more available capacity leading to better performance.

In one embodiment, a data storage device comprises: a memory device having a plurality of planes and a plurality of dies; and a controller coupled to the memory device, wherein the controller is configured to: detect that one or more planes of the plurality of planes have one or more bad blocks; and create one or more first super blocks using blocks from less than all of the planes of the plurality of planes. The controller is further configured to make one or more second super blocks using blocks from each plane of the plurality of planes. Where less than all of the planes of the plurality of planes is equal to one less plane than all of the planes of the plurality of planes. A number of the plurality of planes is equal to two or more. The data storage device is a zoned namespace (ZNS) data storage device.

In another embodiment, a data storage device comprises: a memory device; and a controller coupled to the memory device, wherein the controller is configured to: create one or more first super blocks comprising full die blocks; and create one or more second super blocks comprising a mix of full die blocks and partial die blocks. At least one die is a parity die. The parity is disposed in a full die block. The controller is configured to write manifest data to a full die block. The full die block is adjacent to a block containing parity data. A total number of planes for the one or more first super blocks is an even number. A total number of planes for the one or more second super blocks is an odd number. A total number of planes for the one or more second super blocks is less than the total number of planes for the one or more first super blocks. A total number of planes for the one or more second super blocks is greater than the total number of planes for the one or more first super blocks. The mix of full die blocks and partial die blocks does not contain manifest data.

In another embodiment, a data storage device comprises: means to store data; and a controller coupled to the means to store data, wherein the controller is configured to: set a super block size for a zoned namespace (ZNS) environment of the means to store data; and create one or more first super blocks comprising a mix of full die blocks and partial die blocks, wherein the one or more first super blocks include at least two adjacent full die blocks. The controller is further configured to create one or more second super blocks comprising only full die blocks. The one or more first super blocks comprises a first number of dies, wherein the one or more second super blocks comprises a second number of dies, and wherein the second number of dies is greater than the first number of dies. A number of planes in each one or more first super blocks is equal to a number of planes in each one or more second super blocks. The at least two adjacent full die blocks comprise parity data and manifest data. A number of partial die blocks is a multiple of four. The one or more first super blocks has no parity data or manifest data. The one or more first super blocks has parity data. The one or more first super blocks has parity data and manifest data. The one or more first super blocks has manifest data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device having a plurality of dies, wherein each die of the plurality of dies comprises a plurality of planes; and
a controller coupled to the memory device, wherein the controller is configured to:
detect that one or more planes of the plurality of planes have one or more bad blocks;
create one or more first super blocks using a plurality of die blocks, wherein at least one die block of the one or more first super blocks uses less than all of the planes of the plurality of planes;
create one or more second super blocks using the plurality of die blocks, wherein at least one die block of the one or more second super blocks uses all planes of the plurality of planes;
remove illegal super blocks from the one or more first and second super blocks, wherein an illegal super block is a super block that does not have at least two adjacent die blocks that each use all planes of the plurality of planes; and
write data of a manifest to a first of the at least two adjacent die blocks, wherein the data of the manifest comprises a record of data already written to the super blocks, wherein parity data is stored in a second of the at least two adjacent die blocks.

2. The data storage device of claim 1, wherein less than all of the planes of the plurality of planes is equal to one less plane than all of the planes of the plurality of planes.

3. The data storage device of claim 1, wherein a number of the plurality of planes is equal to two or more.

4. The data storage device of claim 1, wherein the data storage device is a zoned namespace (ZNS) data storage device.

5. A data storage device, comprising:
a memory device; and
a controller coupled to the memory device, wherein the controller is configured to:
create one or more first super blocks using a plurality of die blocks, wherein the one or more first super blocks comprises only full die blocks;
create one or more second super blocks using the plurality of die blocks, wherein the one or more second super blocks comprises at least one full die block and at least one partial die block;
create one or more third super blocks using the plurality of die blocks, wherein the one or more third super blocks comprises only partial die blocks, wherein a number of partial die blocks of each of the one or more third super blocks is a multiple of four;
remove illegal super blocks from the one or more first, second, and third super blocks, wherein an illegal super block is a super block that does not have at least two adjacent full die blocks; and
write data of a manifest to a first of the at least two adjacent full die blocks, wherein the data of the manifest comprises a record of data already written to the super blocks, wherein parity data is stored in a second of the at least two adjacent full die blocks.

6. The data storage device of claim 5, wherein at least one die block of the plurality of die blocks is a parity die block.

7. The data storage device of claim 6, wherein the parity die block is disposed in a full die block.

8. The data storage device of claim 5, wherein the controller is configured to write data of the manifest to a full die block.

9. The data storage device of claim 8, wherein the full die block is adjacent to the parity die block.

10. The data storage device of claim 5, wherein a total number of planes for the one or more first super blocks is an even number.

11. The data storage device of claim 10, wherein a total number of planes for the one or more second super blocks is an odd number.

12. The data storage device of claim 10, wherein a total number of planes for the one or more second super blocks is less than the total number of planes for the one or more first super blocks.

13. The data storage device of claim 10, wherein a total number of planes for the one or more second super blocks is greater than the total number of planes for the one or more first super blocks.

14. The data storage device of claim 5, wherein the one or more second super blocks does not contain data of the manifest.

15. A data storage device, comprising:
means to store data; and
a controller coupled to the means to store data, wherein the controller is configured to:
set a super block size for a zoned namespace (ZNS) environment of the means to store data;
create one or more first super blocks using a plurality of die blocks, wherein the one or more first super blocks comprises at least one full die block and at least one partial die block;
remove illegal super blocks from the one or more first super blocks, wherein an illegal super block is a super block that does not have at least two adjacent full die blocks; and
write data of a manifest to a first of the at least two adjacent full die blocks, wherein the data of the manifest comprises a record of data already written to the super blocks, wherein parity data is stored in a second of the at least two adjacent full die blocks.

16. The data storage device of claim 15, wherein the controller is further configured to create one or more second super blocks using a plurality of die blocks, wherein the one or more second super blocks comprises only full die blocks.

17. The data storage device of claim 16, wherein the one or more first super blocks comprises a first number of die blocks, wherein the one or more second super blocks comprises a second number of die blocks, and wherein the second number of die blocks is greater than the first number of die blocks.

18. The data storage device of claim 16, wherein a number of planes in each one or more first super blocks is equal to a number of planes in each one or more second super blocks.

19. The data storage device of claim 15, wherein a number of partial die blocks is a multiple of four.

20. The data storage device of claim 16, wherein the controller is configured to remove illegal super blocks from the one or more second super blocks, wherein the one or more first super blocks has no parity data or data of the manifest.

21. The data storage device of claim 15, wherein the one or more first super blocks has parity data.

22. The data storage device of claim 15, wherein the one or more first super blocks has parity data and data of the manifest.

23. The data storage device of claim 15, wherein the one or more first super blocks has data of the manifest.

* * * * *